(No Model.)  3 Sheets—Sheet 1.
P. A. DOWD.
Ship's Signal.
No. 237,258.   Patented Feb. 1, 1881.
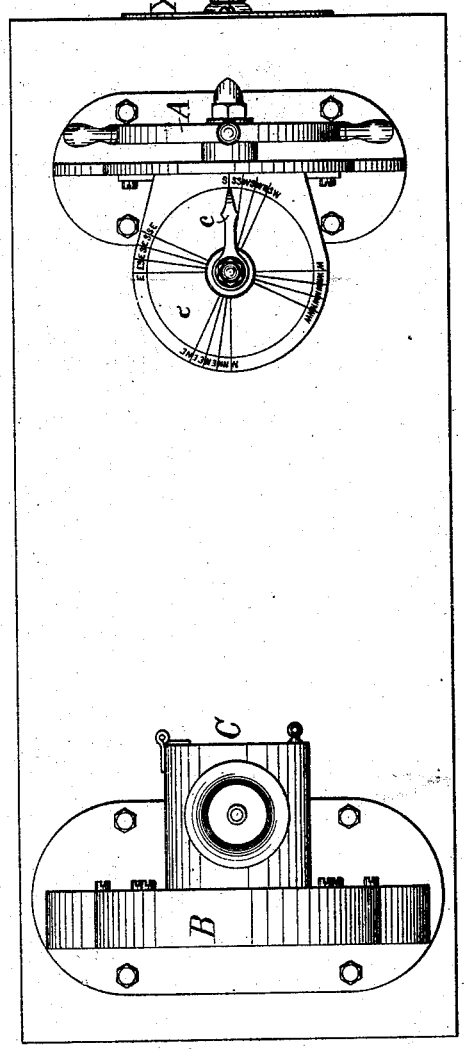
Fig. 7.    Fig. 1.    Fig. 9.
Fig. 6.             Fig. 8.
Witnesses:
Daniel B. Stedman
James Scott
Inventor:
Peter A. Dowd

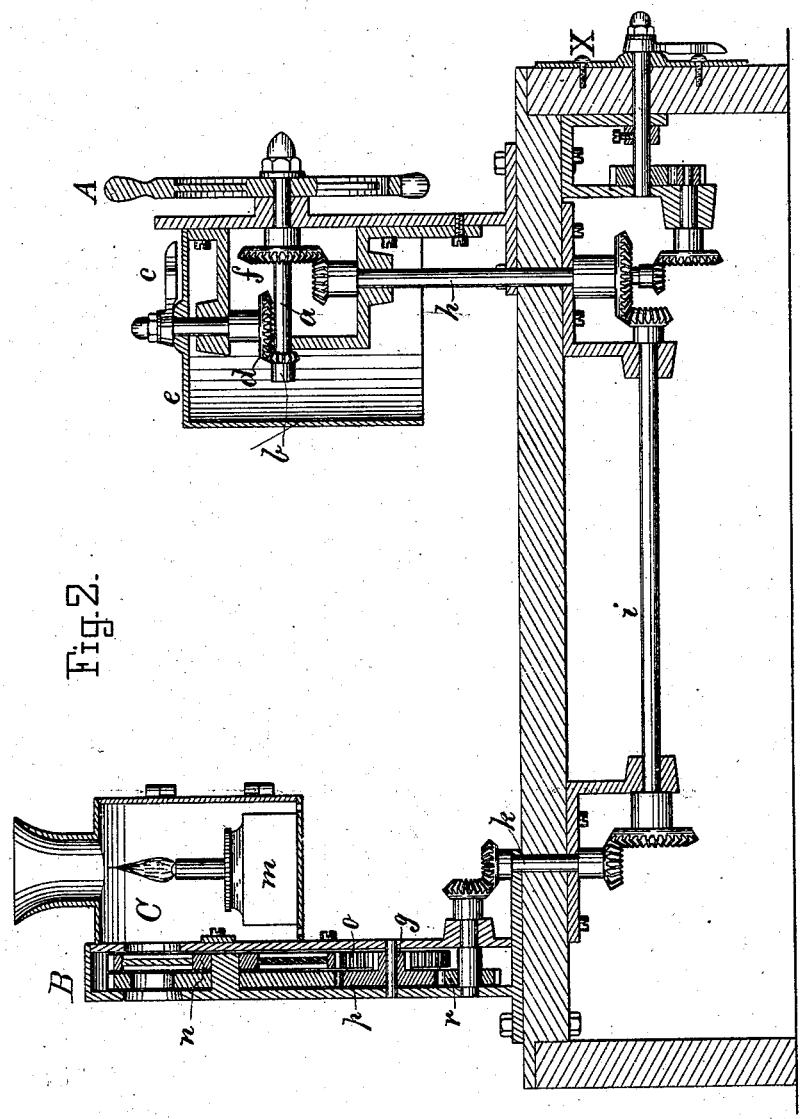

(No Model.)  3 Sheets—Sheet 3.
P. A. DOWD.
Ship's Signal.
No. 237,258. Patented Feb. 1, 1881.
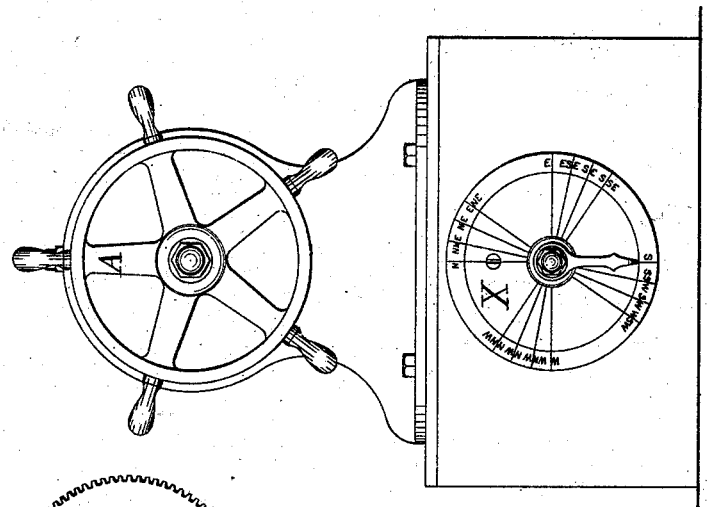
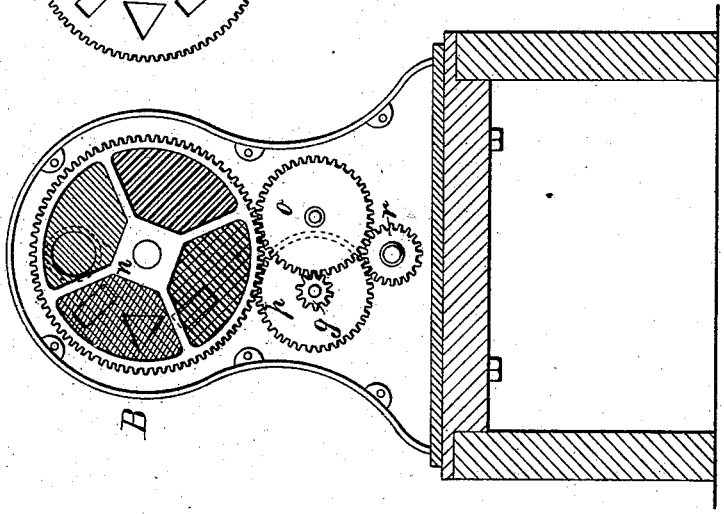
Witnesses:
Daniel D. Stedman.
James Scott
Inventor:
Peter A. Dowd

UNITED STATES PATENT OFFICE.

PETER A. DOWD, OF BOSTON, MASSACHUSETTS.

SHIP'S SIGNAL.

SPECIFICATION forming part of Letters Patent No. 237,258, dated February 1, 1881.

Application filed June 3, 1880. (No model.)

*To all whom it may concern:*

Be it known that I, PETER A. DOWD, of Boston, in the county of Suffolk, State of Massachusetts, have invented a new and useful Improvement in Ships' Signals, of which the following is a specification.

The invention relates to the setting of signals to be seen at night, said signals consisting of different shaped openings or apertures in combination with colors, behind which a light is placed, said signals, in accordance with the shape of aperture and color shown through it, indicating to an approaching vessel or observer the course of a signaling ship. These signals, in my invention, are set at any suitable position in the forward part of the ship, and are operated automatically by the pilot when he gives the course of the ship to the steersman, and simultaneously with such action on the part of the pilot.

In the accompanying drawings, in which similar letters of reference indicate like parts, Figure 1 is a plan view of my invention, looking upon the top, with pilot-house and compass removed. Fig. 2 is a vertical sectional view. Fig. 3 is an end or front view of the pilot's wheel and steersman's indicator, (shown at X,) and also connected with and operating the mechanism of the signaling device. Fig. 4 is an end or front view of the signaling device with cap or covering removed to show operating mechanism. Fig. 5 is the metal or otherwise opaque plate with apertures indicating shape of signals. Figs. 6, 7, 8, and 9 are the signals as indicated to the observer, the different shadings on each set of drawings indicating different colors, as hereinafter explained.

The pilot's wheel A operates a shaft, $a$, upon which are two bevel-gears. These gears are of such computed size as to convey suitable proportional motion to gears meshing into them. The gear $b$ meshes into the bevel-gear $d$ connected with a shaft, to which is attached an index or hand, $c$, capable of motion around the index-plate $e$, and upon this index-plate are marked the points of the compass. The larger bevel-gear, $f$, on the shaft of the pilot's wheel A meshes into a bevel-gear upon an upright shaft, $h$, upon the lower end of which two bevel-gears are fastened, one of which conveys motion, by meshing into suitable gears, to the steersman's indicator X, and the other conveys motion to the shaft $i$. A bevel-gear, suitably meshed to another gear fastened to an upright shaft, $k$, operates the signaling device.

The signaling device and mechanism consists of a house or covering, B, covering the signals, the color-wheel, and the mechanism for operating them, and the lantern-house or light-house C, containing the light or illuminating device $m$. At a height to receive the full light of the illuminating-lantern the covering or face plate at the front of the house B has pierced a suitable opening, both in size and shape, to admit of showing the signals, no other opening permitting light to pass being in it.

The signaling device and mechanism contained in the house B consists of a metal or other opaque plate, Fig. 5, having different-shaped openings cut through it in such places that when revolved upon its center said openings take their place separately before the opening in the front cover of the house B. Revolving upon the same center is a four-spoked wheel. (Shown in Fig. 4, letter $n$.) The spokes of this wheel equally divide its space into four parts and act as holders for different-colored glass, transmitting different colors from the light $m$. Both of these wheels—i. e., Fig. 5 and $n$—are cut on their peripheral edges as spur-gears, and are operated upon a common center or shaft simultaneously, but at different speeds, by the gears shown in Fig. 4, letters $o, p, r$, and $g$. The glasses set in the spoke-wheel $n$ are of four different colors, and are indicative of the four points of the compass with courses off of said points, the courses indicated by the shape of the openings in Fig. 5. The speed of the plate and the color-wheel $n$ is so arranged by the relative proportion of the gears $p, g$, and $o$, meshing into both color-wheel $n$ and plate Fig. 5, that all the openings in Fig. 5 will show upon each color or section in the spoke or color wheel $n$.

The operation of my signaling device is as follows: The pilot turns the wheel A until the hand on the indicator $d$ marks the point of compass he desires the ship to follow. Simultaneously the motion is conveyed to shafts $h$ and $i$ and gears to steersman's indicator X. The mechanism is so adjusted that the hand on the indicator X marks the same point of compass as marked on the pilot's indicator $c$, and the steersman operates the mechanism to give the ship the indicated course. The motion is also conveyed, by the shaft $i$ and by gears, to the upright shaft $k$, operating the signaling mechanism by means of the gears $p$, $g$, and $o$. Assuming, for instance, that a white light indicates south and courses off of south, the direction given by the pilot would turn simultaneously, first, the hand on his own indicator $c$ to the south point; second, would turn the hand to south on the steersman's indicator; third, would bring opposite the opening in the cover or front of the signal-house B the section of color-wheel $n$ filled with white or plain glass, and move plate Fig. 5 to the position where the round opening would be coincident with the opening in the cover. To an observer the signal shown would be a round white light. Similarly, a movement of the pilot's indicator-hand to S. S. W. would move the steersman's indicator-hand to the same point at X, and move the plate Fig. 5 sufficiently to present to the observer the upright parallelogram, the color-wheel moving at such a slow rate of speed as to continue the white light before the opening in cover of house B. The signal would then be a white light upright parallelogram. If the pilot indicates on his indicator $c$ east, west, or north, or courses off these points, the color-disk revolves to a distance where, for each main point of compass and courses off such points, a different-colored light will be shown and each shaped aperture in Fig. 5 be brought, respectively, coincident with the color and opening in cover of house B.

It will be understood that the code of signals, both as to shape and color, may be changed, reduced, or multiplied as may agreed upon by the maritime service. The same mechanism, by slight alterations in proportion of gears, producing motions accomplishing such results in combination with changes in aperture in Fig. 5 and changes in colors in color-wheels; also, that changes in length and direction of shafts will convey motion to the signaling device, no matter in what part of the vessel it may be situated, and several signals may be operated from the same movement of the pilot's wheel, and that the signal X to the steersman may be dispensed with, and the pilot operate the steering mechanism by proper connection with and from his wheel A.

I do not claim as my invention any shape or description of aperture in combination with any color, as I am aware that such signals set by hand have been already used; nor do I confine myself to my now-described details of mechanism; but

I claim—

1. The combination of a plate containing different-shaped apertures, a wheel containing transparent colors, and the pilot's wheel, all connected by suitable machinery for producing the results herein described.

2. The combination of a plate containing different-shaped apertures, a wheel containing transparent colors, a steersman's indicator, and the pilot's wheel, all connected by suitable mechanism for producing the results herein described.

3. A signaling device consisting of a plate or wheel with different-shaped apertures and a plate or wheel containing transparent colors, both revolving on a common center before a fixed light.

PETER A. DOWD.

Witnesses:
D. B. STEDMAN,
ALONZO B. WENTWORTH.